(12) United States Patent
Ojard et al.

(10) Patent No.: US 6,777,093 B1
(45) Date of Patent: Aug. 17, 2004

(54) BOND LAYER FOR SILICON CONTAINING SUBSTRATE

(75) Inventors: Greg C. Ojard, Vernon, CT (US); Harry E. Eaton, Woodstock, CT (US); Shantikumar V. Nair, Sunderland, MA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/443,341

(22) Filed: May 22, 2003

(51) Int. Cl.⁷ .............................. B32B 15/04; F03B 3/12
(52) U.S. Cl. .................. 428/448; 428/446; 428/701; 428/702; 428/325; 428/697; 428/699; 428/293.1; 416/241 B
(58) Field of Search ................................ 428/701, 702, 428/697, 698, 699, 446, 448, 323, 325, 293.1; 416/241 B, 241 R

(56) References Cited

U.S. PATENT DOCUMENTS

| | | | |
|---|---|---|---|
| 5,110,652 A | * | 5/1992 | Allaire et al. ............... 428/114 |
| 6,254,935 B1 | | 7/2001 | Eaton et al. |
| 6,284,325 B1 | | 9/2001 | Eaton, Jr. et al. |
| 6,296,942 B1 | | 10/2001 | Eaton, Jr. et al. |
| 6,299,988 B1 | | 10/2001 | Wang et al. |
| 6,312,763 B1 | | 11/2001 | Eaton, Jr. et al. |
| 6,352,790 B1 | | 3/2002 | Eaton et al. |
| 6,365,288 B1 | | 4/2002 | Eaton et al. |
| 6,410,148 B1 | | 6/2002 | Eaton, Jr. et al. |
| 6,444,335 B1 | * | 9/2002 | Wang et al. ................ 428/701 |
| 6,541,134 B1 | * | 4/2003 | Strangman et al. ......... 428/698 |
| 2002/0025454 A1 | | 2/2002 | Wang et al. |

* cited by examiner

*Primary Examiner*—Jennifer McNeil
(74) *Attorney, Agent, or Firm*—Bachman & LaPointe, P.C.

(57) ABSTRACT

A bond layer for a silicon based substrate comprises a silicon layer having a dispersion of particulate material therein, wherein the particulate material is selected from the group consisting of (1) alumina, (2) yttria, (3) aluminum silicate, (4) compounds of rare earth elements, alkaline earth elements, aluminum, oxygen, yttrium, nitrogen, niobium, tantalum, hafnium, zirconium, carbon, silicon and mixtures thereof.

10 Claims, 1 Drawing Sheet

BOND LAYER FOR SILICON CONTAINING SUBSTRATE

BACKGROUND OF THE INVENTION

The present invention is drawn to an environmental barrier coating and, more particularly, an environmental barrier coating applied to a silicon containing substrate.

Silicon based ceramics exhibit accelerated oxidation rates in high temperature, aqueous environments such as for example, the combustor and turbine sections of gas turbine engines. In order to reduce the rate of oxidation on silicon based substrates used as ceramic components in such environments, significant effort has been given to providing environment barrier coating, i.e., barrier layer(s), for the silicon based substrates so as to increase the service life of such component parts.

With reference to FIGS. 1a and 1b, prior art environmental barrier coatings form a composite 10 comprising a silicon based substrate 12, a bond coat or layer 14 which comprises a dense continuous layer of silicon metal, a barrier layer 16 which comprises either an alkaline earth aluminosilicate based on barium and strontium, or a yttrium silicate and a top coat or layer 18 which comprises a refractory oxide and/or silicate or other metal oxide such as, for example, zirconium oxide. In addition, an intermediate layer 20 may be provided between the 14 bond coat and the barrier 16 and/or between the barrier layer 16 and top layer 18. The intermediate layer comprises, for example, a mixture of the barrier layer material with an additional oxide such as mullite. These prior art environmental barrier systems have proved to be protective with respect to oxidation of the silicon based substrate and, in addition, adherent. However, it has now been found that certain mechanical properties of the silicon substrate suffer as demonstrated by a significant reduction in 4-point bend strength at room temperature. It is believed that the loss of mechanical properties results from the cracking of the bond layer adjoining the silicon containing substrate which causes stress concentrations which initiate cracks in the substrate itself. The cracks in the bond coat or layer arise from many causes including differences in the coefficient of thermal expansion between the substrate and bond layer and stresses introduced as a result of rapid cyclic cooling and heating of the component parts.

Naturally, it would be highly desirable to provide an improved bond coat layer for silicon containing substrates which do not result in significant loss of mechanical properties.

Accordingly, it is a principle object of the present invention to provide an improved bond layer for an environmental barrier coating which overcomes the foregoing prior art problems.

SUMMARY OF THE INVENTION

The foregoing object is achieved by way of the present invention wherein a bond layer for a silicon based substrate comprises a silicon layer having a dispersion of particulate material therein, wherein the particulate material is selected from the group consisting of (1) alumina, (2) yttria, (3) aluminum silicate, (4) compounds of rare earth elements, alkaline earth elements, aluminum, oxygen, yttrium, nitrogen, niobium, tantalum, hafnium, zirconium, carbon, silicon and mixtures thereof.

A particular advantage of the present invention is that the fracture toughness of the bond layer, or any other layer in which the particulates are introduced, is improved. In addition, as a particulate material can be in the form of particles, fibers, whiskers and mixtures thereof, the fibers can be located and oriented within a bond layer and any other layer of an environmental barrier coating based on the end use application.

The particulate material may be applied by any method known in the prior art. Such as, for example, a thermal spray method.

Further objects and advantages will appear hereinbelow.

DETAILED DESCRIPTION

Figure 1A:
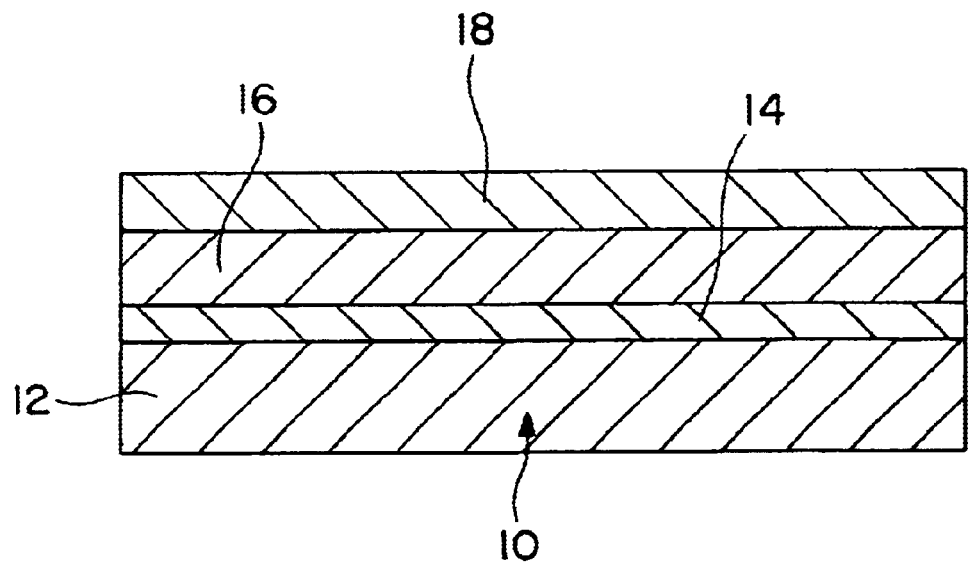
FIGS. 1a and 1b are schematic illustrations of composite articles in accordance with the prior art.
Figure 1B:
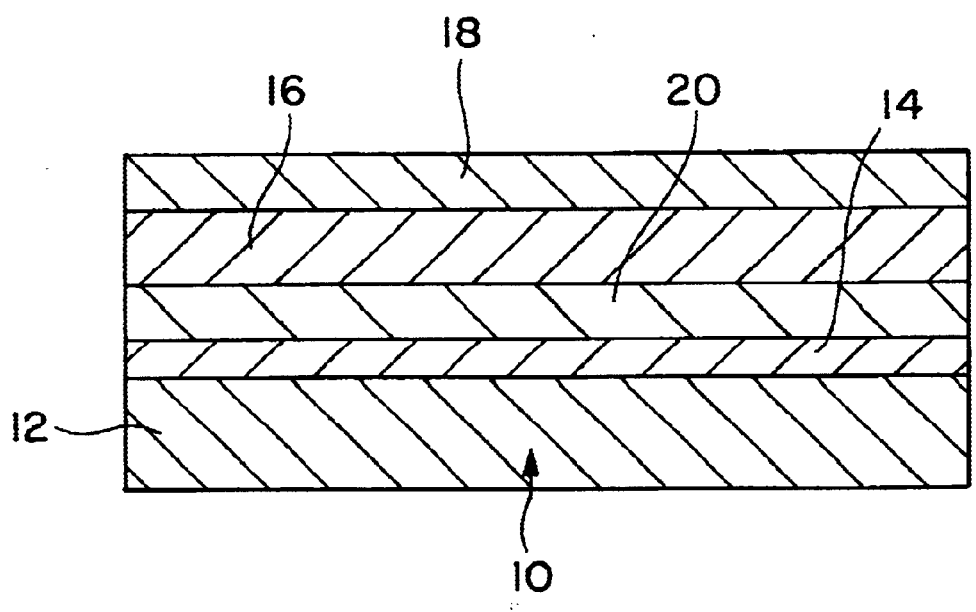

The present invention relates to an article comprising a silicon based substrate and a bond layer. The bond layer may be applied directly on the silicon base substrate or, alternatively, a silicon oxide intermediate layer or other intermediate layer may be provided between the bond layer and the silicon based substrate.

The silicon based substrate may be a silicon ceramic substrate or a silicon containing metal alloy. In a preferred embodiment, the silicon containing substrate is a silicon containing ceramic material such as, for example, silicon carbide, silicon carbide composite, silicon nitride, silicon nitride composite, silicon oxynitride and silicon aluminum oxynitride.

In accordance with the present invention, the bond layer comprises a silicon layer having a dispersion of particulate material therein, wherein the particulate material is selected from the group consisting of (1) alumina, (2) yttria, (3) aluminum silicate, (4) compounds of rare earth elements, alkaline earth elements, aluminum, oxygen, yttrium, nitrogen, niobium, tantalum, hafnium, zirconium, carbon, silicon and mixtures thereof. The particulate material may be in the form of particles, fibers, and mixtures thereof. Particle sizes which are useful in the present invention are particles which have a mean diameter of between 0.1 to 100 microns, preferably between 0.5 to 10 microns. If the particulate material is in the form of fibers, it is desirable for the fibers to have a mean length of between 0.5 to 100 microns, preferably 1 to 20 microns, and a mean diameter of 0.1 to 50 microns, preferably 0.5 to 10 microns. The particulate material is present in an amount of between 25 to 90 vol. %, preferably between 40 to 75 vol. %.

The particulate material, in the present invention, is included in the bond layer and the bond layer may be applied directly on the silicon containing substrate or, alternatively, an intermediate layer, such as for example silicon oxide, may be provided between the bond layer and the silicon based substrate. As is recognized in the prior art, other layers may be included on the article of the present invention including top layers, protective layers, and other intermediate layers, and it is within the scope of the present invention to include the particulate material in any or all of these additional layers as required for mechanical benefit.

The particulate material in the form of particles and/or fibers may be formed in the bond layer by any method known in the prior art. A particularly suitable method is a process for plasma spraying fibers to adhere to the surface of the silicon substrate followed by application of the bond layer material on the particulate material. A suitable process is disclosed in U.S. Pat. No. 4,595,637 which is assigned to the assignee of the instant invention. The disclosure of U.S. Pat. No. 4,595,637 is incorporated herein by reference.

The advantages of the present invention include reduced cracking and improved adherence of the environmental barrier coating.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modification which are within its spirit and scope as defined by the claims.

What is claimed is:

1. An article comprising a silicon based substrate, a bond layer and a protective layer, the bond layer comprises a silicon layer having a dispersion of particulate material therein, wherein the particulate material is selected from the group consisting of (1) alumina, (2) yttria, (3) aluminum silicate, (4) compounds of rare earth elements, alkaline earth elements, aluminum, yttrium, nitrogen, niobium, tantalum, hafnium, zirconium, carbon, silicon and mixtures thereof.

2. An article according to claim 1, wherein the particulate comprises at least one of particulate and fibers.

3. An article according to claim 1, wherein the particulate comprises particulate having a mean diameter of between 0.1 to 100 microns.

4. An article according to claim 1, wherein the particulate comprises particulate having a mean diameter of between 0.5 to 10 microns.

5. An article according to claim 1, wherein the particulate is present in an amount of between 25 to 90 vol. %.

6. An article according to claim 1, wherein the particulate is present in an amount of between 40 to 75 vol. %.

7. An article according to claim 1, wherein the particulate comprises fibers having a mean length of 0.5 to 100 microns and a mean diameter of 0.1 to 5.0 microns.

8. An article according to claim 7, wherein the particulate is present in an amount of between 25 to 90 vol. %.

9. An article according to claim 1, wherein the particulate comprises fibers having a mean length of 1 to 20 microns and 0.5 to 10 microns.

10. An article according to claim 9, wherein the particulate is present in an amount of between 40 to 75 vol. %.

* * * * *